United States Patent [19]

Lassanske et al.

[11] 4,425,140
[45] Jan. 10, 1984

[54] GASEOUS FUEL AND AIR PROPORTIONING DEVICE

[75] Inventors: George G. Lassanske, Oconomowoc; Arthur G. Poehlman, West Bend, both of Wis.

[73] Assignee: Outboard Marine Corporation, Waukegan, Ill.

[21] Appl. No.: 352,011

[22] Filed: Feb. 24, 1982

[51] Int. Cl.[1] .......................... B01F 3/02; F02M 21/04
[52] U.S. Cl. ................................ 48/180 C; 48/180 P; 123/527; 261/50 R; 261/50 B
[58] Field of Search ............. 48/180 R, 180 B, 180 C, 48/180 M, 180 P; 123/525, 527; 261/50 R, 50 B

[56] References Cited

U.S. PATENT DOCUMENTS

| | | | |
|---|---|---|---|
| 2,927,848 | 3/1960 | Baverstock | 48/184 |
| 2,939,775 | 6/1960 | Middleton et al. | 48/180 |
| 2,983,592 | 5/1961 | Jones | 48/184 |
| 3,081,160 | 3/1963 | Ensign | 48/184 |
| 3,123,285 | 3/1964 | Lee | 230/133 |
| 3,650,255 | 3/1972 | McJones | 123/120 |
| 4,063,905 | 12/1977 | Johnson et al. | 48/180 R |
| 4,280,968 | 7/1981 | Smeets | 48/180 C |
| 4,308,843 | 1/1982 | Garretson | 123/525 |

Primary Examiner—Arthur D. Kellogg
Attorney, Agent, or Firm—Michael, Best & Friedrich

[57] ABSTRACT

The device for proportioning a gaseous fuel and air for combustion in an internal combustion engine includes a plate-like first member having a peripheral edge portion and a second member cooperating with the first member having a peripheral edge portion and a second member cooperating with the first member to define a mixing chamber having an outlet adapted to be connected in communication with the air intake of the engine carburetor. The second member also includes an annular portion having an arcuate first wall which is convex to and spaced from the peripheral edge portion of the first member to define an annular venturi having an inlet in communication with the atmosphere and an annular outlet in communication with the mixing chamber. A base member or second wall cooperates with the arcuate wall to form a substantially closed, annular plenum chamber into which a gaseous fuel, such as natural gas, is admitted when the engine is to be operated on the gaseous fuel. The gaseous fuel is admitted into the mixing chamber from the plenum chamber through one or more ports in the arcuate wall at or in the vicinity of the throat of the annular venturi. A pair of circumferentially spaced radially extending partitions located on the opposite sides of each port define a radially extending venturi which has a throat located at or in the vicinity of the port and serves to induce flow of the gaseous fuel through the corresponding port. The proportioning device preferably is arranged to fit inside the housing of an existing air cleaner.

12 Claims, 2 Drawing Figures

GASEOUS FUEL AND AIR PROPORTIONING DEVICE

BACKGROUND OF THE INVENTION

This invention relates to devices for proportioning a gaseous fuel and air for combustion in an internal combustion engine. In one aspect, the invention relates to such devices which can be mounted on the air intake of the existing carburetor of an internal combustion engine to provide the engine with the capability of being operated on either a liquid fuel or a gaseous fuel.

Systems for providing internal combustion engines with the capability of operating on either liquid fuel, such as gasoline, or a gaseous fuel, such as natural gas, typically include a so-called gas mixer which fits onto the air intake of the existing carburetor and proportions the gaseous fuel and air in the proper ratio for combustion.

Attention is directed to the following United States Patents:

| Patentee | U.S. Pat. No. | Issue Date |
|---|---|---|
| Baverstock | 2,927,848 | March 8, 1960 |
| Middleton et. al. | 2,939,775 | June 7, 1960 |
| Jones | 2,983,592 | May 9, 1961 |
| Ensign | 3,081,160 | March 12, 1963 |
| Lee | 3,123,285 | March 3, 1964 |
| McJones | 3,650,255 | March 21, 1972 |
| Johnson et. al. | 4,063,905 | December 20, 1977 |
| Smeets | 4,280,968 | July 28, 1981 |

Attention is also directed to application Ser. No. 314,266, filed Oct. 23, 1981 and assigned to the assignee of the present application.

SUMMARY OF THE INVENTION

The invention provides a device for proportioning a gaseous fuel and air for an internal combustion engine, which device includes a wall means defining a mixing chamber having an outlet adapted to be connected in communication with the internal combustion engine. The wall means also defines an annular venturi having an annular inlet in communication with the atmosphere, an annular outlet in communication with the mixing chamber and an intermediate annular throat of reduced cross sectional areas and further defines a substantially closed, annular plenum chamber. The device includes means for selectively admitting a gaseous fuel into the plenum chamber, one or more ports communicating between the mixing chamber and the plenum chamber, and means disposed in the annular venturi defining a radially extending venturi having an inlet in communication with the atmosphere, an outlet in communication with the mixing chamber and an intermediate throat at or on the vicinity of the port, whereby air flowing through the radial venturi induces flow of the gaseous fuel through the port.

In one embodiment, the radial venturi is formed by a pair of circumferentially spaced, radially extending partitions located on the opposite sides of a port and extending between the peripheral edge portion of the first member and the arcuate wall of the second member. The partitions converge and then diverge in the direction of air flow to form the radial venturi throat.

In a preferred embodiment, the mixing device is adapted to fit inside the housing of an existing air cleaner.

One of the principal features of the invention is the provision of a compact device for proportioning a gaseous fuel and air for combustion in an internal combustion engine, which device can be mounted inside the housing of an existing air cleaner to provide the engine with the capability of being operated on either a liquid fuel or a gaseous fuel.

Another of the principal features of the invention is the provision of such a proportioning device which does not require means for increasing the air flow area when operation of the engine is switched from a gaseous fuel to a liquid fuel.

Other features, aspects and advantages of the invention will become apparent to those skilled in the art upon reviewing the following detailed description, the drawing and the appended claims.

Figure 2:
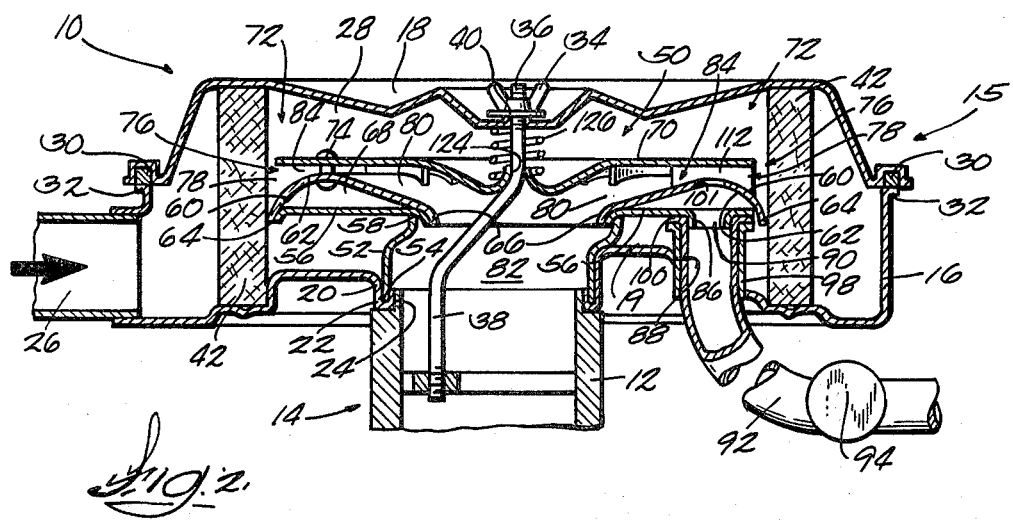
FIG. 2 is a sectional view taken generally along line 2—2 in FIG. 1.

Before explaining at least one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in the drawing is an air cleaner 10 mounted on the air intake 12 of a conventional carburetor 14 (illustrated fragmentarily in FIG. 2) of a conventional internal combustion engine. Externally, the air cleaner 10 is of conventional construction and includes a housing 15 including a bowl-like bottom section 16 and a removable top section or cover 18. The bottom section 6 includes a bottom wall 19 and a generally central sleeve portion 20 terminating in an upturned lip 22 which defines an aperture 24 for receiving the carburetor air intake 12. The air cleaner 10 includes an air inlet duct 26 through which atmospheric air is admitted into an interior chamber 28 defined by the bottom section 16 and the cover 18.

The cover 18 carries an annular seal or gasket 30 which seats on a peripheral flange 32 on the bottom section 16. The cover 18 is removably held in place by a wing nut 34 threaded onto the outer end 36 of an attachment rod 38 extending through a central aperture 40 in the cover 18. The other end of the attachment rod 38 is connected to the carburetor 14 in the usual manner. Located inside the chamber 28 is a conventional filter element 42 through which the air flows enroute from the inlet duct 26 to the carburetor intake 12.

Disposed inside the chamber 28 is a proportioning device, designated generally by reference numeral 50, for mixing air and a gaseous fuel, such as natural gas. The proportioning device 50 includes an annular sleeve 52 having a lower end 54 which rests in the lip 22 on the bottom housing section 16, an annular base member 56 connected to the upper end 58 of the sleeve 52, and an annular member 60 having an arcuate wall 62 and further having respective outer and inner peripheral edges 64 and 66 which are fastened to the base member 56 to define a substantially closed annular plenum chamber 68.

The proportioning device 50 also includes a plate or disc-like member or top 70 which has an annular peripheral edge portion 72 and which is mounted on the annular member 60 in spaced relationship to the arcuate wall 62 via a plurality of circumferentially spaced spacers 74. The arcuate wall 62 is convex with respect to the peripheral edge portion 72 of the top 70 and cooperates therewith to form an annular venturi designated generally by reference number 76. The annular venturi 76 has an annular inlet 78 in communication with the atmosphere via the filter element 40 and the air inlet duct 26, an annular outlet 80 in communication with a mixing chamber 82 formed primarily by the top 70 and the sleeve 52, and an intermediate annular throat 84 in the area of minimum spacing between the arcuate wall 62 and the top 70.

Means are provided for selectively admitting the gaseous fuel into the plenum chamber 68. While various means can be used, in the specific instruction illustrated, such means includes a circular opening 86 provided in the base member 56 and an opening 88 provided in the bottom wall 19 of the air cleaner section 16 and located coaxially with the base member opening 86. The base member opening 86 is formed by a nipple 90. One end of a pipe 92 is connected in communication with a source of natural gas (not shown) through a suitable shutoff valve 94 (illustrated schematically). The other end of the pipe 92 extends through a flexible grommet 98 mounted in the opening 88 in the air cleaner bottom wall 19 and fits over the nipple 90 on the base member 56. The pipe 92 terminates in a flare 100 and is held in place by a clamp plate 102 which is suitably fastened to and clamps the hose flare 100 against the base member 56.

The gaseous fuel is admitted into the mixing chamber 82 from the plenum chamber 68 through one or more openings or ports 101 in the arcuate wall 62 at or in the vicinity of the annular venturi throat 84. In the specific instruction illustrated, a plurality (e.g., 6) of the ports 101 are provided in the arcuate wall 62 at substantially equal, circumferentially spaced intervals.

As air flows through the annular venturi 76 toward the mixing chamber 82, the reduced pressure condition created in the vicinity of the annular venturi throat 84 where the highest velocity exists tends to "suck" or draw the gaseous fuel through the ports 101 when the engine is operating on a gaseous fuel. To further reduce the pressure in the vicinity of the ports 101 and thereby increase the suction, means defining a radially extending venturi is provided in the annular venturi 76 in association with at least some of, and preferably all, the ports 101.

Figure 1:
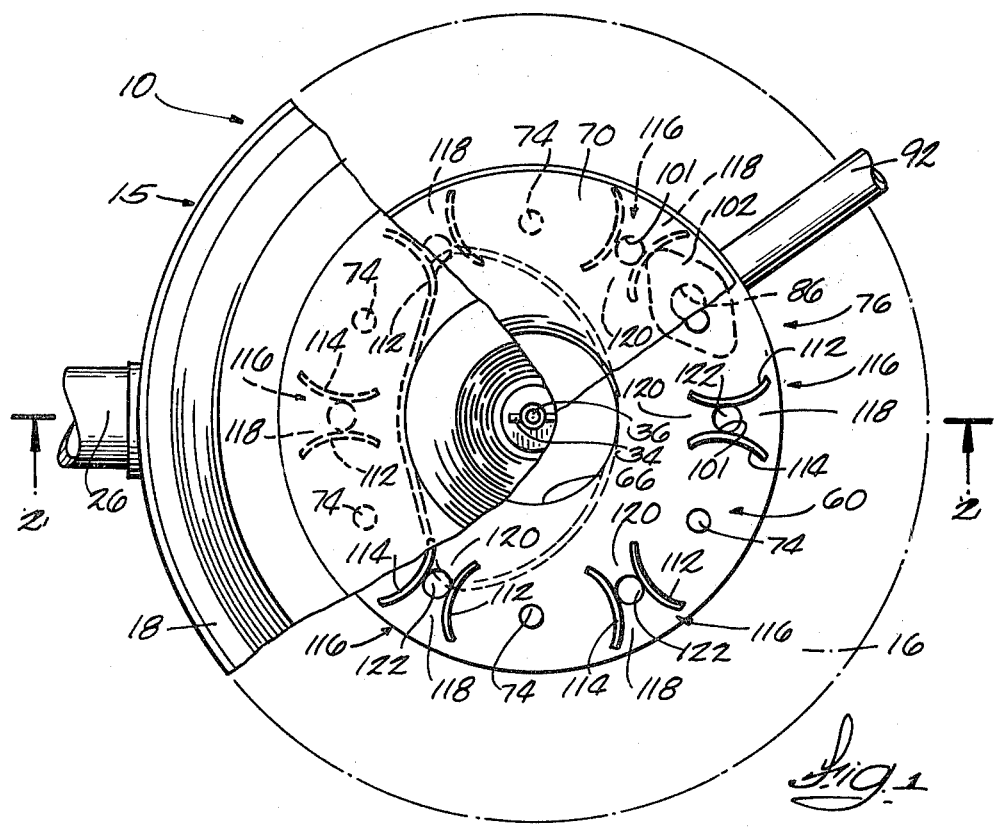
FIG. 1 is a top view, partially broken, of a proportioning device which embodies various of the features of the invention and which is shown mounted inside the housing of an existing air cleaner mounted on the air intake of an internal combustion engine carburetor.

More specifically, as best shown in FIG. 1, a pair of circumferentially spaced, radially extending walls or partitions 112 and 114 extend heightwise between the arcuate wall 62 and the top 70 and extend lengthwise radially inwardly from the outer edge of the top 70 to a point beyond the port 101. The partitions 112 and 114 converge and then diverge in the direction of air flow to form a radially extending venturi, generally designated 116. The radial venturi 116 has a generally rectangular inlet 118 in communication with the atmosphere via the filter element 42, a generally rectangular outlet 120 in communication with the mixing chamber 82 and an intermediate, generally rectangular throat 122 in the area of minimum spacing between the partitions 112 and 114 and between the arcuate wall 62 and the top 70. The throat 122 of the radial venturi 116 is at or in the vicinity of the port 101.

As air flows through the radial venturi 116, the further reduced pressure condition created in the vicinity of the throat 122 induces greater flow of the gaseous fuel through the corresponding port 101 when the engine is operating on a gaseous fuel.

When the engine is operating on a liquid fuel, such as gasoline, the flow area for air to the carburetor intake 12 is the total cross sectional area of the annular venturi throat 84 except for the relatively small space occupied by the partitions 112 and 114.

Thus, while the partitions 112 and 114 do not substantially decrease the total air flow area when the engine is operating on a liquid fuel, the radial venturis 116 formed thereby do substantially increase the suction in the area immediately adjacent to the corresponding ports 101 to more effectively draw the gaseous fuel into the mixing chamber 82 when the engine is operating on a gaseous fuel. In other words, the radial venturis 116 serve as boost venturis. Accordingly, there is no need to provide some mechanical means for increasing the flow area when operation of the engine is switched from a gaseous fuel to a liquid fuel as is the case with many prior constructions.

The top 70 of the proportioning device 50 includes a central aperture 124 through which the attachment rod 38 extends. A compression spring 126 disposed between the air cleaner cover 24 and the proportioning device top 70 maintains the lower end 54 of the sleeve 52 in firm engagement with the air cleaner lip 22.

By being arranged to fit inside the housing of an existing air cleaner, the proportioning device does not require any additional underhood space. Also, the existing manifold heating system does not have to be removed or modified, so the warm-up characterisics of the engine when operating on gasoline are not affected.

Various of the features of the invention are set forth in the following claims:

We claim:

1. A device for proportioning a gaseous fuel and air for combustion in an internal combustion engine, said device including wall means defining a mixing chamber having an outlet adapted to be connected in communication with the internal combustion engine, said wall means also defining an annular venturi having an annular inlet in communication with the atmosphere, an annular outlet in communication with said mixing chamber, and an intermediate annular throat of reduced cross sectional area, said wall means further defining a substantially closed, annular plenum chamber, means for selectively admitting a gaseous fuel into said plenum chamber, a port communicating between said plenum chamber and said annular throat, and partition means disposed in said annular venturi and defining a radially extending venturi having an inlet in communication with the atmosphere, an outlet in communication with said mixing chamber and an intermediate throat at or in the vicinity of said port, whereby air flowing through said radial venturi induces flow of the gaseous fuel through said port.

2. A device according to claim 1 including a plurality of said ports which are circumferentially spaced at substantially equal intervals, and a plurality of said radially extending venturis respectively associated with said plurality of ports.

3. A device according to claim 1 wherein said radial venturi defining means comprises a pair of circumferentially spaced, radially extending partitions located on the opposite side of said port, said partitions converging and then diverging in the direction of air flow to form said radial venturi throat.

4. A device according to claim 1 wherein said wall means includes a first member having a peripheral edge portion, a second member cooperating with said first member to define said mixing chamber and including an annular portion having an arcuate first wall which is convex to and spaced from said peripheral edge portion of said first chamber to define therebetween said annular venturi.

5. A device according to claim 4 wherein said second member further includes a second wall cooperating with said first wall to define said plenum chamber.

6. A device for proportioning a gaseous fuel and air for combustion in an internal combustion engine and adapted to fit inside an existing air cleaner including a housing having a hollow interior and a generaly central opening adapted to receive the air intake of the engine carburetor, said device including a plate-like first member disposed in the hollow interior of the air cleaner housing and having a peripheral edge portion, a second member disposed in the hollow interior of the air cleaner housing and cooperating with said first member to define a mixing chamber having an outlet in communication with the carburetor air intake, said second member including an annular portion having an arcuate first wall which is convex to and spaced from said peripheral edge portion of said first member to define therebetween an annular venturi having an annular inlet in communication with the atmosphere, an annular outlet in communication with said mixing chamber and an annular throat of reduced cross section area intermediate said annular venturi inlet and outlet, said second member further including a second wall cooperating with said first wall to define a substantially closed, annular plenum chamber, means for selectively admitting a gaseous fuel into said plenum chamber, at least one port in said first wall for admitting the gaseous fuel from said plenum chamber into said mixing chamber, and means disposed in said annular venturi defining a radially extending venturi having an inlet in communication with the atmosphere, an outlet in communication with said mixing chamber and an intermediate throat at or in the vicinity of said port, whereby air fklowing through said radial venturi induces flow of the gaseous fuel through said port.

7. A device according to claim 6 including a plurality of said ports which are circumferentially spaced at substantially equal intervals.

8. A device according to claim 7 wherein said radial venturi defining means comprises a pair of circumferentially spaced radially extending partitions located on the opposite sides of each of said ports and extending between said peripheral edge portion of said first member and said first wall of said second member, said partitions converging and then diverging in the direction of air flow to form said radial venturi throat.

9. A device for proportioning a gaseous fuel and air for combustion in an internal combustion engine, said device including wall means defining a mixing chamber having an outlet adapted to be connected in communication with the internal combustion engine, said wall means also defining an annular venturi having an annular inlet in communication with the atmosphere, an annular outlet in communication with said mixing chamber, and an intermediate annular throat of reduced cross sectional area, a port communicating with said annular throat and with a source of gaseous fuel, and partition means disposed in said annular venturi and defining a radially extending venturi having an inlet in communication with the atmosphere, an outlet in communication with said mixing chamber, and an intermediate throat at or in the vicinity of said port.

10. A device according to claim 9 including a plurality of said ports which are circumferentially spaced at substantially equal intervals, and a plurality of said radially extending venturis respectively associated with said pluarlity of said ports.

11. A device according to claim 9 wherein said radial venturi defining means comprises a pair of circumferentially spaced, radially extending partitions located on the opposite side of a said port, said partitions converging and then diverging in the direction of air flow to form said radial venturi throat.

12. A device according to claim 9 wherein said wall means includes a first member having a peripheral edge portion, a second member cooperating with said first member to define said mixing chamber and including an annular portion having an arcuate first wall which is convex to and spaced from said peripheral edge portion of said first chamber to define therebetween said annular venturi.

* * * * *